Nov. 2, 1965

C. J. HIMEL 3,215,061

APPARATUS FOR CLEANING AND COOKING CRABS

Filed April 29, 1963

3 Sheets-Sheet 1

INVENTOR
Curtis J. Himel

BY Ralph Burch

ATTORNEY

Nov. 2, 1965   C. J. HIMEL   3,215,061
APPARATUS FOR CLEANING AND COOKING CRABS
Filed April 29, 1963   3 Sheets-Sheet 2
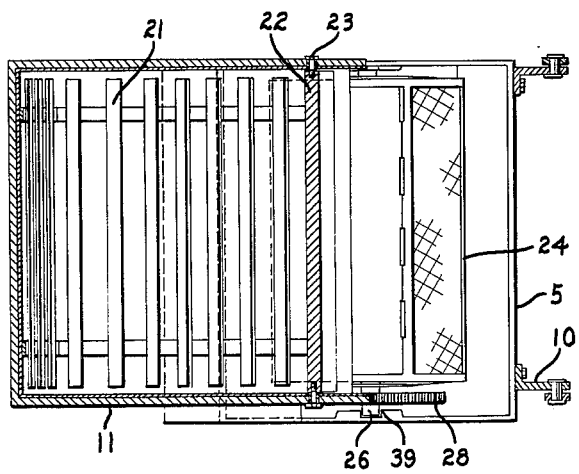
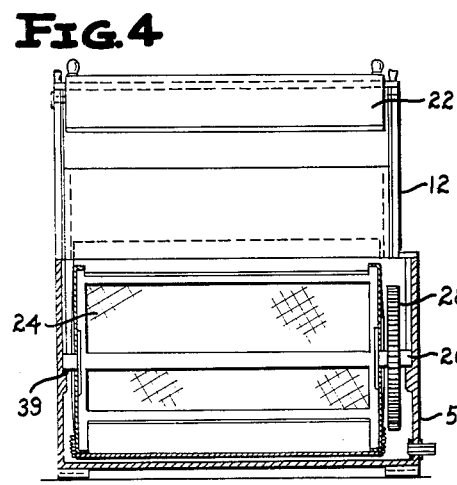
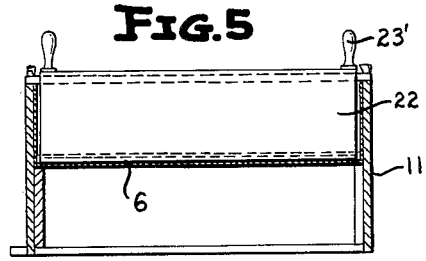
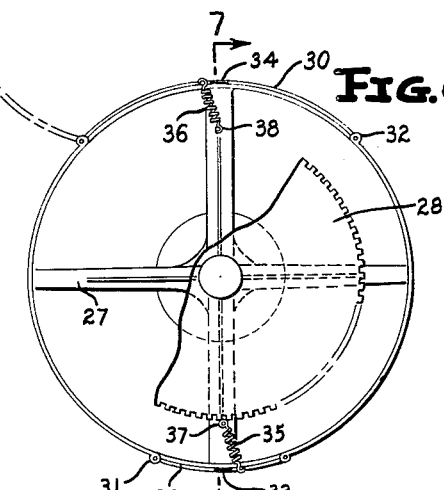
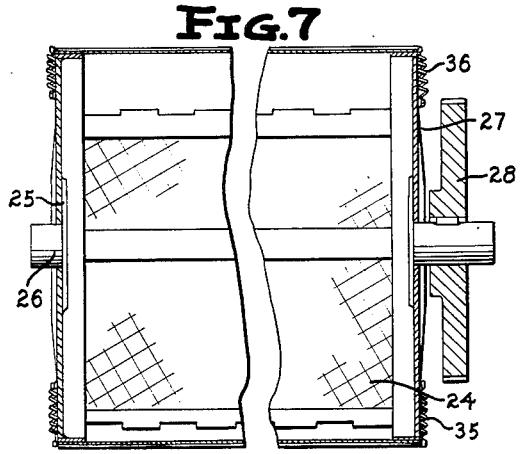
INVENTOR
Curtis J. Himel
BY Ralph Burch
ATTORNEY Nov. 2, 1965　　　C. J. HIMEL　　　3,215,061
APPARATUS FOR CLEANING AND COOKING CRABS
Filed April 29, 1963　　　3 Sheets-Sheet 3

INVENTOR
Curtis J. Himel
BY Ralph Burch
ATTORNEY

United States Patent Office 3,215,061
Patented Nov. 2, 1965

3,215,061
APPARATUS FOR CLEANING AND
COOKING CRABS
Curtis J. Himel, Rte. 1, Box 355, Belle Chasse, La.
Filed Apr. 29, 1963, Ser. No. 276,416
12 Claims. (Cl. 99—352)

This invention relates to apparatus for cleaning and cooking crabs, crayfish, lobsters and shrimp.

It is important after catching crabs that they be cleaned and cooked before they die but under present methods of cleaning and cooking it has been found many dead crabs are cooked with the live crabs and sold on the market.

It is an object of the present invention to provide cleaning apparatus which will automatically eliminate the dead crabs from the live crabs immediately before the crabs are cooked.

A further object of the invention resides in providing a cleaning tank adapted to support a rotatable drum and having pivoted troughs mounted on its upper edges provided with inclined ramps having their upper ends disposed in spaced apart relation over the top of the drum so that when a supply of crabs is deposited on the lower ends of the ramps the live crabs in an attempt to escape will crawl up the ramps and drop into the drum while the dead crabs will remain at the bottom of the ramps.

A still further object of the invention resides in providing a drum to receive the live crabs which may be easily removed from the cleaning tank and conveyed to a boiler adapted to receive the drum whereby the crabs may be immediately cooked after they are cleaned.

A still further object of the invention resides in providing a boiler adapted to receive the drum containing the crabs having means for rotating the drum while the crabs are being cooked.

Other objects and advantages of the invention will be apparent during the course of the following description.

Figure 1:
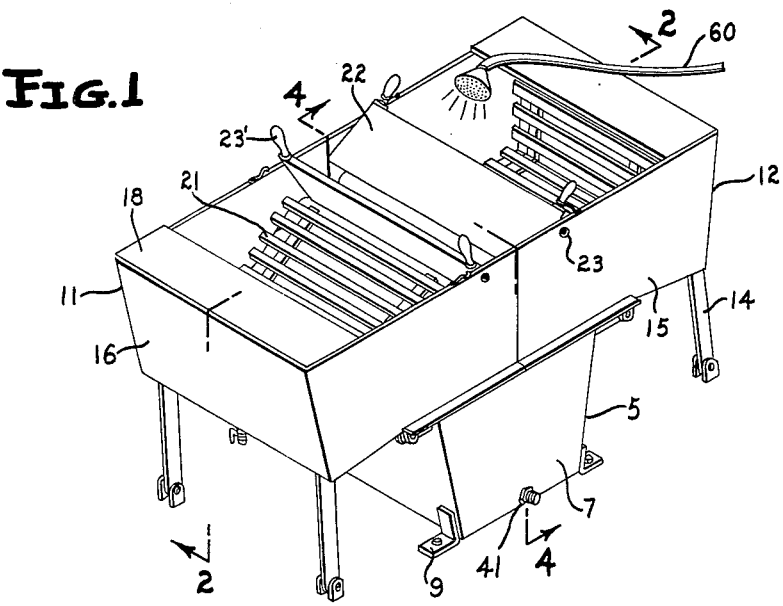
Figure 2:
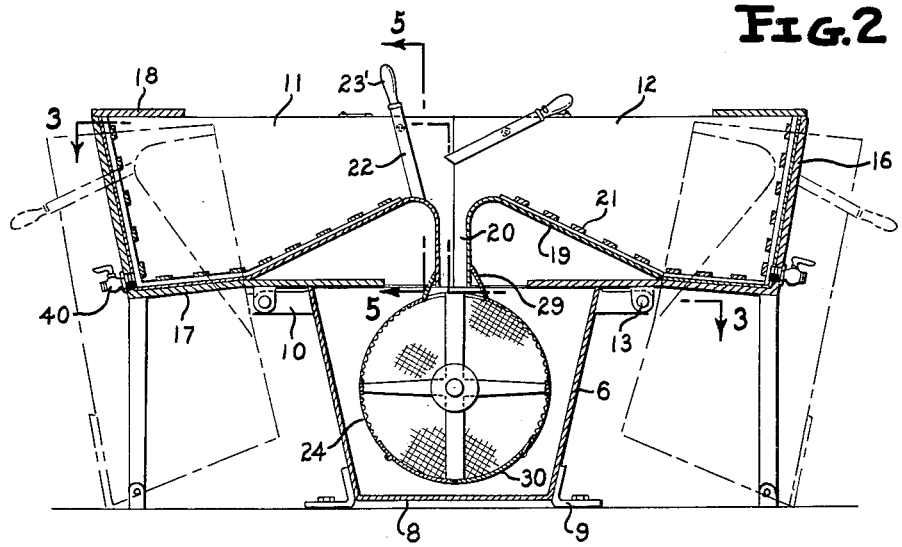
Figure 8:
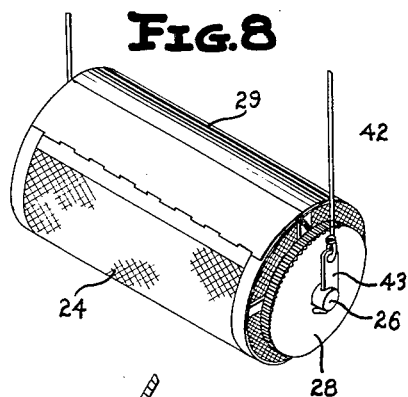
Figure 9:
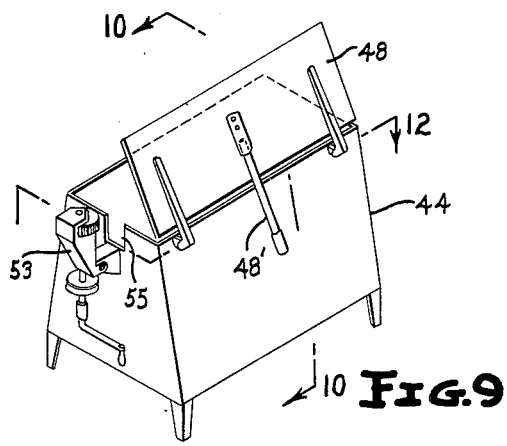
Figure 10:
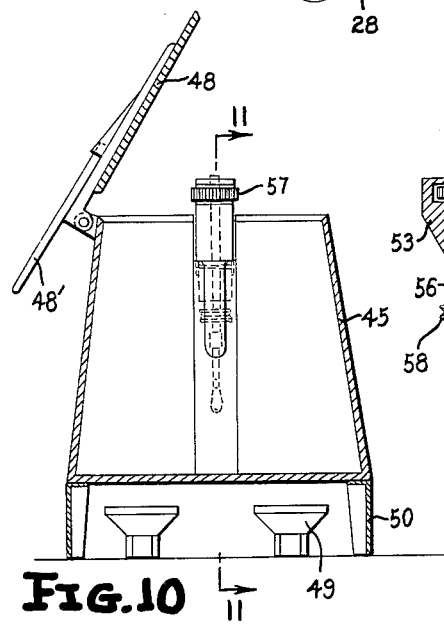
Figure 11:
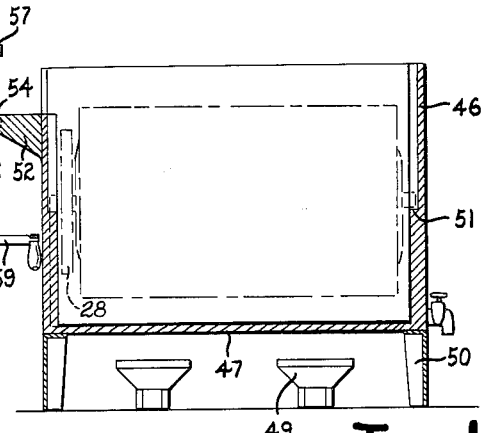
Figure 12:
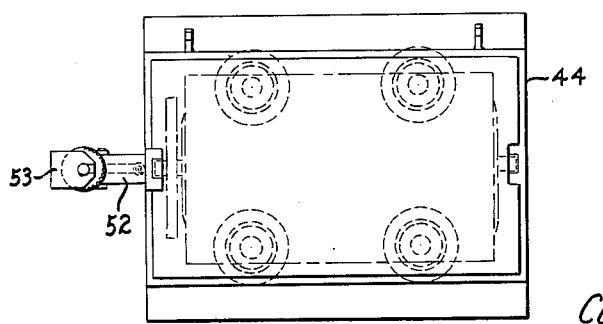

In the accompanying drawings forming a part of this specification and in which like numerals are employed to designate like parts throughout the same, FIG. 1 is a perspective view of the cleaning tank, FIG. 2 is a longitudinal sectional view taken on line 2—2 of FIG. 1, FIG. 3 is a sectional view taken on line 3—3 of FIG. 2, FIG. 4 is a cross sectional view taken on line 4—4 of FIG. 1, FIG. 5 is a cross sectional view taken on line 5—5 of FIG. 2, FIG. 6 is a fragmentary end view of the cleaning receptacle, FIG. 7 is a section taken on line 7—7 of FIG. 6, FIG. 8 is a perspective view of the drum attached to the conveyor, FIG. 9 is a perspective view of the boiler, FIG. 10 is a section taken on line 10—10 of FIG. 9, FIG. 11 is a section taken on line 11—11 of FIG. 10, and, FIG. 12 is a top view of the boiler.

In the drawings, a tank 5 having side walls 6, end walls 7 and bottom wall 8 is attached to a suitable base by brackets 9. Arms 10 extend laterally from the upper edges of the side walls 6 of the tank and a pair of troughs 11 and 12 are pivotally mounted intermediate their length, as at 13, on the arms. The troughs when in horizontal position extends across the top of the tank with their inner ends disposed above the center of the tank and pivoted braces 14 attached to the base support the outer ends of the troughs which extend beyond the sides of the tank. When the braces are removed the outer ends of the troughs swing downwardly raising the inner ends to the position shown in dotted lines, in FIG. 2. Each trough has side walls 15, an outer end wall 16, bottom wall 17 and partial top wall 18 at their outer ends. A ramp 19 disposed in the bottom of each trough is inclined upwardly from the outer end of the trough and the upper end of each ramp is bent downwardly in spaced apart relation to provide a passage 20 disposed centrally over the tank. The ramps 19 and end wall 16 of the troughs are covered with a removable slatted platform 21. A gate 22 is pivotally mounted in the side walls of the troughs, as at 23, above the upper end of the ramps with its lower edge normally in contact with the ramp. Handles 23' are attached to the upper edge of the gate for swinging the gate to raise the lower edge above the ramp.

A cylindrical drum 24, constructed of open mesh material, is provided at each end with a central collar 25 for fixedly supporting stub shafts 26 and extending radially from the collars are a series of bracing arms 27 attached to the ends of the drum. The stub shaft 26 at one end of the drum has a gear wheel 28 fixedly mounted thereon. Opposite sides of the drum are provided with different size openings covered by pairs of hinged doors 29 and 30, which are hingedly mounted, as at 31 and 32, so that when in closed position the adjoining ends of the doors overlap, as at 33 and 34. The doors are normally held in closed position by coil springs 35 and 36, one end of the springs being connected to the overlapping doors and the other end of the springs being removably connected to pins 37 and 38 affixed to one of the bracing arms 27.

The drum 24 is removably mounted in the tank 5 by the shafts 26 which rest on bearings 39 formed on the end walls of the tank. The drum is positioned with the smaller opening below the passage 20 and when the doors are opened and the troughs swung to a horizontal position the downwardly bent ends of the ramps 19 will be disposed between the open doors with the passage 20 in alinement with the opening.

The troughs at their outer ends are provided with drain cocks 40 and one end of tank 5 is provided with a drain cock 41 to permit water and sediment to be drained from the troughs and tank after the cleaning step. A hose 60 leading from a water supply source is employed to fill the tank 5 with water.

When the crabs within the drum are clean, the drum is removed from the tank by swinging the troughs to the position shown in dotted lines in FIG. 2 and lowering the cables 42 of an overhead hoist and conveyor into the tank having hooks 43 at their ends which engage the shafts 26 of the drum, so that when the cables are raised by the hoist the drum is lifted from the tank and conveyed to a position over the boiler 44.

The boiler 44 has side walls 45, end walls 46 and bottom wall 47. A hinged cover 48 closes the top of the boiler and is provided with a handle 48' for opening and closing the cover. The boiler is supported in elevated position over a series of burners 49 by legs 50 attached to the bottom wall 47. The inner faces of the end walls have bearings 51 formed therein to rotatably support the shafts 26 of the drum when the drum is lowered by the hoist into the boiler. The end wall of the boiler which supports the shaft 26 carrying the gear wheel 28 has a bracket 52 attached to the outer face of the wall adjacent its upper edge which pivotally supports a bearing block 53. The bearing block is pivotally mounted on the outer end of the bracket, as at 54, to swing down over the end wall into a slot 55 formed in the end wall. A shaft 56 is rotatably mounted in the bearing block having a gear wheel 57 fixed thereon adjacent the free end of the block which projects from the lower face of the block for meshing engagement with the gear wheel 28 when the block is swung down over the end wall. One end of shaft 56 projects from the block and has a drive pulley 58 mounted thereon for connection with suitable power means. A hand crank 59 is removably connected to the free end of the shaft for manually turning the shaft.

In use, the troughs 11 and 12 are swung to the position shown in dotted lines in FIG. 2 to allow the drum 24 to be placed in the tank 5. After the drum is inserted in the tank it is rotated to position the doors 29 at the top of the drum and then the doors are swung to an open posiiton. The troughs are then swung to a horizontal position and supported by braces 14, in which position the passage 20 is in vertical alinement with the opening of the drum. The crabs to be cleaned are deposited in the outer ends of the trough and in order to reach the passage 20 must crawl up the inclined ramps 19. The live crabs in an attempt to escape will crawl up the ramps, and on reaching the top will fall into the passage 20 and deposited in the drum. The dead crabs being unable to crawl up the ramps will remain in the troughs. Water is introduced into the troughs by a hose 60 or other suitable means and flows into the tank. When the drum is filled with crabs the movement of the crabs into the passage 20 can be stopped by closing the gates 22 and then the troughs are swung to an open position and the doors of the drum are closed.

The drum containing the cleaned crabs is lifted from the tank by an overhead hoist and conveyed to the boiler 44 which has been partially filled with the cooking liquid. The drum is lowered into the boiler with the shafts seated in the bearings 51. The bearing block 53 is then swung to a horizontal position to engage the gear wheel 57 with the gear wheel 28, so that upon turning the shaft 56 the drum will be rotated in the boiler. As the bearing block fits in the slot 55 when in a horizontal position the cover 48 may be closed during the cooking process.

Having thus described my invention, I claim:

1. Apparatus for cleaning crabs comprising a tank, a drum mounted longitudinally in said tank having an opening in the side wall, a pair of troughs extending across and rockably mounted on opposite edges of said tank with their inner ends in confronting spaced apart relation and disposed over said drum, upwardly inclined ramps in the bottom of said troughs having their upper ends disposed over said drum in spaced relation to provide a passage in alinement with the opening in said drum.

2. Apparatus for cleaning crabs comprising a tank, a drum mounted longtitudinally in said tank having an opening in the side wall, a closure covering said opening, a pair of troughs pivotally mounted intermediate their ends on opposite edges of said tank with their inner ends in confronting spaced apart relation and disposed over said drum, upwardly inclined ramps in the bottom of said troughs having their upper ends disposed over said drum and bent downwardly for engagement with said closure when in open position, the bent ends being spaced apart to form a passage in alinement with the opening in said drum.

3. Apparatus for cooking crabs comprising a cleaning tank, a drum removably mounted longitudinally in said tank having an opening in the side wall, a closure for said opening, a pair of troughs pivotally mounted intermediate their ends on opposite edges of said tank with their inner ends in confronting spaced apart relation disposed over said drum, upwardly inclined ramps in the bottom of said troughs having their upper ends disposed over said drum in spaced relation to provide a passage in alinement with the opening of said drum, a boiler, means for lifting said drum from said tank and conveying the drum to said boiler, and means for rotatably supporting said drum in said boiler.

4. Apparatus for cooking crabs as described in claim 3 including means attached to said boiler for rotating said drum.

5. Apparatus for cleaning crabs comprising a tank, a drum mounted longitudinally in said tank having an opening in the side wall, and upwardly inclined ramps pivotally mounted on opposite walls of said tank and extending across the upper edges of the walls with their upper ends in confronting spaced apart relation to form a passage in alinement with the opening of said drum.

6. Apparatus for cleaning crabs as described in claim 5 having a closure for the opening in said drum and means carried by said ramps for holding said closure in open position.

7. Apparatus for cleaning crabs as described in claim 6 including means for normally holding said closure in closed position.

8. Apparatus for cleaning crabs as described in claim 5 including gates pivotally mounted above the upper ends of said ramps for engagement therewith to close the ramps.

9. Apparatus for cleaning crabs comprising a tank having side and end walls, a drum mounted longitudinally in said tank having an opening in its side wall, a ramp attached to each side wall of said tank extending across the upper edge of the wall in an upwardly inclined plane, the upper ends of said ramps being disposed above said drum in confronting spaced apart relation to define a passage in vertical alinement with the opening in said drum.

10. Apparatus for cleaning crabs as described in claim 9 including a pivoted closure for the opening in said drum and means depending from the upper ends of said ramps for engagement with said closure to hold the closure in open position.

11. Apparatus for cleaning crabs as described in claim 9 wherein said ramps are rockably mounted on the side walls of said tank to swing to a vertical position.

12. Apparatus for cleaning crabs as described in claim 9 including gates pivotally mounted above the upper ends of said ramps for engagement therewith to close the ramps.

References Cited by the Examiner

UNITED STATES PATENTS

| | | | |
|---|---|---|---|
| 508,197 | 11/93 | Zehe | 134—157 |
| 1,573,626 | 2/26 | Braley | 68—210 X |
| 2,650,489 | 8/53 | Harvey | 68—17 X |

CHARLES A. WILLMUTH, *Primary Examiner.*

ROBERT E. PULFREY, *Examiner.*